(12) United States Patent
Nuber et al.

(10) Patent No.: US 11,199,711 B2
(45) Date of Patent: Dec. 14, 2021

(54) ENHANCED REALITY SYSTEMS

(71) Applicant: HEWLETT-PACKARD DEVELOPMENT COMPANY, L.P., Spring, TX (US)

(72) Inventors: Nathan Barr Nuber, Fort Collins, CO (US); Ian N. Robinson, Palo Alto, CA (US); Robert Paul Martin, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,251

(22) PCT Filed: Oct. 18, 2017

(86) PCT No.: PCT/US2017/057103
§ 371 (c)(1),
(2) Date: Oct. 18, 2019

(87) PCT Pub. No.: WO2019/078836
PCT Pub. Date: Apr. 25, 2019

(65) Prior Publication Data
US 2020/0241299 A1    Jul. 30, 2020

(51) Int. Cl.
*G02B 27/01*    (2006.01)
*G06T 7/73*    (2017.01)
*G06F 3/01*    (2006.01)
*G06F 3/03*    (2006.01)
*G06T 13/40*    (2011.01)
*G06T 19/00*    (2011.01)

(52) U.S. Cl.
CPC ..... *G02B 27/0172* (2013.01); *G02B 27/0101* (2013.01); *G06F 3/011* (2013.01); *G06F 3/0304* (2013.01); *G06T 7/74* (2017.01); *G06T 13/40* (2013.01); *G06T 19/006* (2013.01); *G02B 2027/0138* (2013.01); *G02B 2027/0187* (2013.01); *G06T 2207/30196* (2013.01); *G06T 2207/30244* (2013.01)

(58) Field of Classification Search
None
See application file for complete search history.

(56) References Cited

U.S. PATENT DOCUMENTS 8,786,680 B2    7/2014   Shiratori et al.
2012/0249741 A1*  10/2012  Maciocci ............. G06T 15/503
                                              348/46

(Continued)

OTHER PUBLICATIONS

Gilbert, A. et al., Marker-less Pose Estimation, http://cs231n.stanford.edu/reports/2017/pdfs/219.pdf.

(Continued)

*Primary Examiner* — Kenneth B Lee, Jr.
(74) *Attorney, Agent, or Firm* — Fabian VanCott

(57) ABSTRACT

A method of deriving data of a user's body pose in an enhanced reality system includes, with at least one camera coupled to a body-mounted housing, capturing at least one image in three-dimensional (3D) space of at least one extremity of a body of a user on which the body-mounted housing is mounted, and with a processor executing a body pose module, deriving data of a user's body pose based on the at least one image captured by the camera.

19 Claims, 6 Drawing Sheets

(56) References Cited

U.S. PATENT DOCUMENTS

| | | | | |
|---|---|---|---|---|
| 2012/0327194 A1* | 12/2012 | Shiratori | ............... | G06F 3/011 |
| | | | | 348/47 |
| 2015/0138069 A1 | 5/2015 | Fuchs et al. | | |
| 2016/0077581 A1* | 3/2016 | Shi | ................ | G06F 1/163 |
| | | | | 340/12.5 |
| 2017/0274282 A1* | 9/2017 | Nishi | ................ | A63F 13/25 |
| 2017/0293206 A1* | 10/2017 | Wood | ................ | F16M 13/02 |

OTHER PUBLICATIONS

Rhodin, H. et al., EgoCap: Egocentric Marker-less Motion Capturewith Two Fisheye Cameras, 2016, https://arxiv.org/pdf/1701.00142.pdf.
Rhodin, H. et al.,From Motion Capture to Interactive Virtual Worlds, 2016, http://scidok.sulb.uni-saarland.de/volltexte/2017/6741/pdf/Dissertation_Rhodin_12_21_print0.pdf.

* cited by examiner

ENHANCED REALITY SYSTEMS

BACKGROUND

Augmented reality, virtual reality, enhanced reality, and mixed reality all involve users interacting with real and/or perceived aspects of an environment in order to manipulate and/or interact with that environment. Interaction by a user in the augmented reality, virtual reality, and/or mixed reality environments may be viewed and interacted with by others such that a plurality of individuals may be interacting together in the augmented reality, virtual reality, and/or mixed reality environments.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
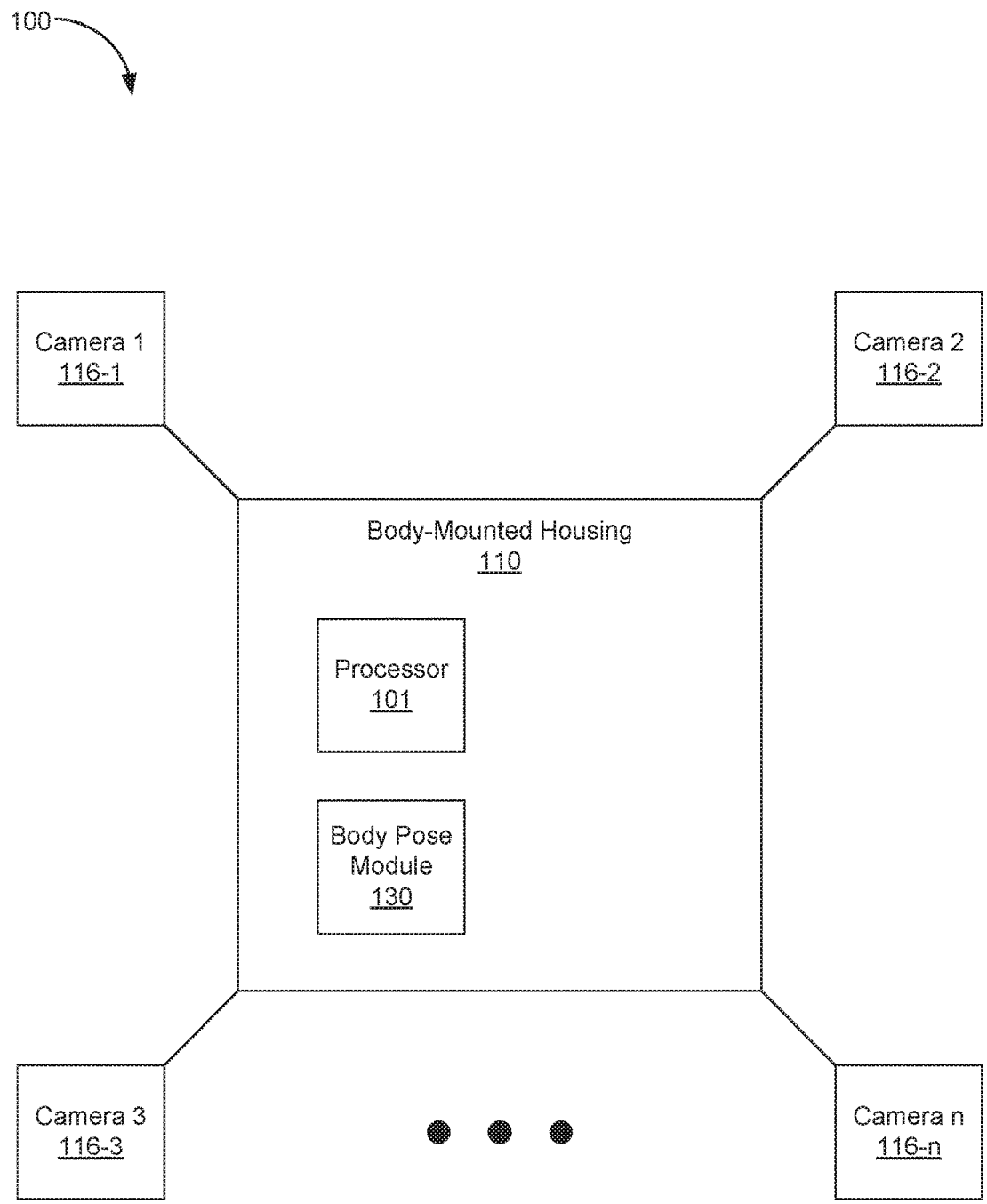
FIG. 1 is a block diagram of an enhanced reality system, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Virtual reality (VR), augmented reality (AR), and mixed reality (MR) systems and devices are used by a user to perceive a visual representation of a VR, AR, and/or MR environments. VR systems and devices implement virtual reality (VR) headsets to generate realistic images, sounds, and other human discernable sensations that simulate a user's physical presence in a virtual environment presented at the headset. In some examples, the VR system and/or device includes physical spaces and/or multi-projected environments. AR systems and devices may include those systems and devices that implement live direct and/or indirect view of a physical, real-world environment whose elements are augmented by computer-generated sensory input such as sound, video, graphics and/or GPS data. MR systems and devices include the merging of real and virtual worlds to produce new environments and visualizations where physical and digital objects co-exist and interact in real time. For simplicity in description, a virtual reality (VR), augmented reality (AR), and mixed reality (MR) systems and devices are referred to herein as enhanced reality (ER) systems and/or devices.

During use of these ER system and/or devices, viewers may be allowed to view the ER environment a user implementing the ER system is experiencing. The viewers may view the experience via a display device communicatively coupled to the ER system or in using Head-mounted displays (HMDs) coupled to the participants in the ER system. Thus, any number of viewers may be involved in the experience and may participate in the operation and enjoyment of the ER system and devices.

However, during use of the ER systems viewers viewing the ER experience on a display device or using another HMD may fail to appreciate where the user, immersed in the ER environment, is located and what pose that individual is in. This may cause difficulty between two users of a HMD within the ER environment since in the real environment the two users may bump into one another during their movements within the ER environment. Further, it is difficult for viewers of a display device that are watching the ER environment to understand where within the ER environment the users may be located. This diminishes the experience of the viewers as well. Further, a user within the ER environment may not feel present within the ER environment because they may not be able to see parts of his or her own body. This creates a situation where the user is not fully immersed within the ER environment, and results in a diminished experience.

Examples described herein provide an enhanced reality system including a body-mounted housing, at least one camera mounted to the body-mounted housing, the at least one camera being posed to capture at least one image of a body of a user on which the body-mounted housing is mounted, and a body pose module to, when executed by a processor, derive data of a user's body pose based on the at least one image captured by the at least one camera.

The body-mounted housing may include a backpack form factor. The at least one camera may include four cameras where each camera captures an extremity of a body of the user in three-dimensional (3D) space.

The camera may be coupled to the body-mounted housing via an arm extending from the body-mounted housing and a spring-loaded dislocatable joint between the arm and the body-mounted housing to return that arm to a non-dislocated position if the arm is dislocated through accidental collision with a body part or external object. The enhanced reality system may include a sensor to detect when the spring-loaded dislocatable joint is dislocated. The body pose module disregards images captured by the camera in response to a determination that the spring-loaded dislocatable joint is dislocated based on data from the sensor. The enhanced reality system may also include an avatar module to, when executed by the processor, render an avatar of the users body based on the data of the user's body pose, and at least one display device communicatively coupled to the avatar module to receive and display the rendered avatar.

Examples described herein also provide a method of deriving data of a user's body pose in an enhanced reality system includes, with at least one camera coupled to a body-mounted housing, capturing at least one image in three-dimensional (3D) space of at least one extremity of a body of a user on which the body-mounted housing is mounted, and with a processor executing a body pose module, deriving data of a user's body pose based on the at least one image captured by the camera. The method may include, with an avatar module, rendering an avatar of the user's body based on the derived data from the at least one image captured by the camera, and sending the rendered avatar to at least one display device communicatively coupled to the avatar module. In one example, deriving pose data from the captured image may include approximating boundaries of the user based on the captured image, estimating a limb pose of the user based on the captured image, and estimating a skeletal frame of the user based on the captured image. Further, deriving pose data may include determining a position and an orientation of a head-mounted display (HMD) via the at least one camera. Still further, deriving pose data may include considerations based on the possible range of natural movements of the user's body.

Examples described herein also provide a computer program product for deriving data of a user's body pose in an enhanced reality system. The computer program product includes a computer readable storage medium including computer usable program code embodied therewith. The computer usable program code, when executed by a processor, captures at least one image in three-dimensional (3D) space of a body of a user on which the body-mounted housing is mounted with at least one camera coupled to a body-mounted housing. The computer usable program code, with a processor executing a body pose module, derives data of a user's body pose based on the at least one image captured by the camera.

The computer program product may also include computer usable program code to, when executed by a processor, send the data of the user's body pose to an avatar module, with an avatar module, render an avatar of the user based on the derived data of a user's body pose, and with a display device communicatively coupled to the avatar module, display the rendered avatar of the user. Deriving body pose data includes approximating boundaries of the user based on the captured image, estimating a limb pose of the user based on the captured image, and estimating a skeletal frame of the user based on the captured image. Deriving body pose data may include determining a position and an orientation of the HMD relative to a user's body via the at least one camera. Further, deriving body pose data may include consideration for anatomical properties and movements of the user's body. Still further, deriving body pose data may include consideration for a number of spatial constraints within a non-enhanced reality environment.

As used in the present specification and in the appended claims, the term "enhanced reality (ER)" is meant to be understood as a reality that has been enhanced via, for example, a virtual reality system or device, an augmented reality system or device, and/or a mixed reality system or device.

As used in the present specification and in the appended claims, the terms "pose" or "body pose" are meant to be understood as any position or orientation of a portion of a user's body relative to another portion of the user's body.

Turning now to the figures, FIG. 1 is a block diagram of an ER system (100), according to an example of the principles described herein. The ER system (100) may include a body-mounted housing (110), and at least one camera (116) mounted to the body-mounted housing (110). In FIG. 1, four cameras (116-1, 116-2, 116-3, 116-n, collectively referred to herein as 116) are depicted. However, any number of cameras (116) may be included in the ER system (100) as indicated by the ellipses between camera (116-3) and camera (116-n).

The at least one camera (116) may be positioned to capture at least one image of a body (FIG. 3, 300) of a user on which the body-mounted housing (110) is mounted. In one example, the at least one camera (116) is mounted on a number of mechanical arms (FIG. 2, 117-1, 117-2, 117-3, 117-n, collectively referred to herein as 117) that extend away from the body-mounted housing (110). Further, in one example, the at least one camera (116) may be positioned to correspond to the user's shoulders and hips, and include a relatively wide field of view (FOV) such as that provided by a wide-angle camera to capture a full extent of a respective limb of the user in any pose with respect to the joints of the user's limbs. Further, the at least one camera is able to image the user's head. In this manner, the at least one camera (116) is able to image a full extent of the user's body, including his or her extremities. The ER system (100) may include a body pose module (130) to, when executed by a processor (101), derive data of a users body pose based on the at least one image captured by the at least one camera.

Figure 2:
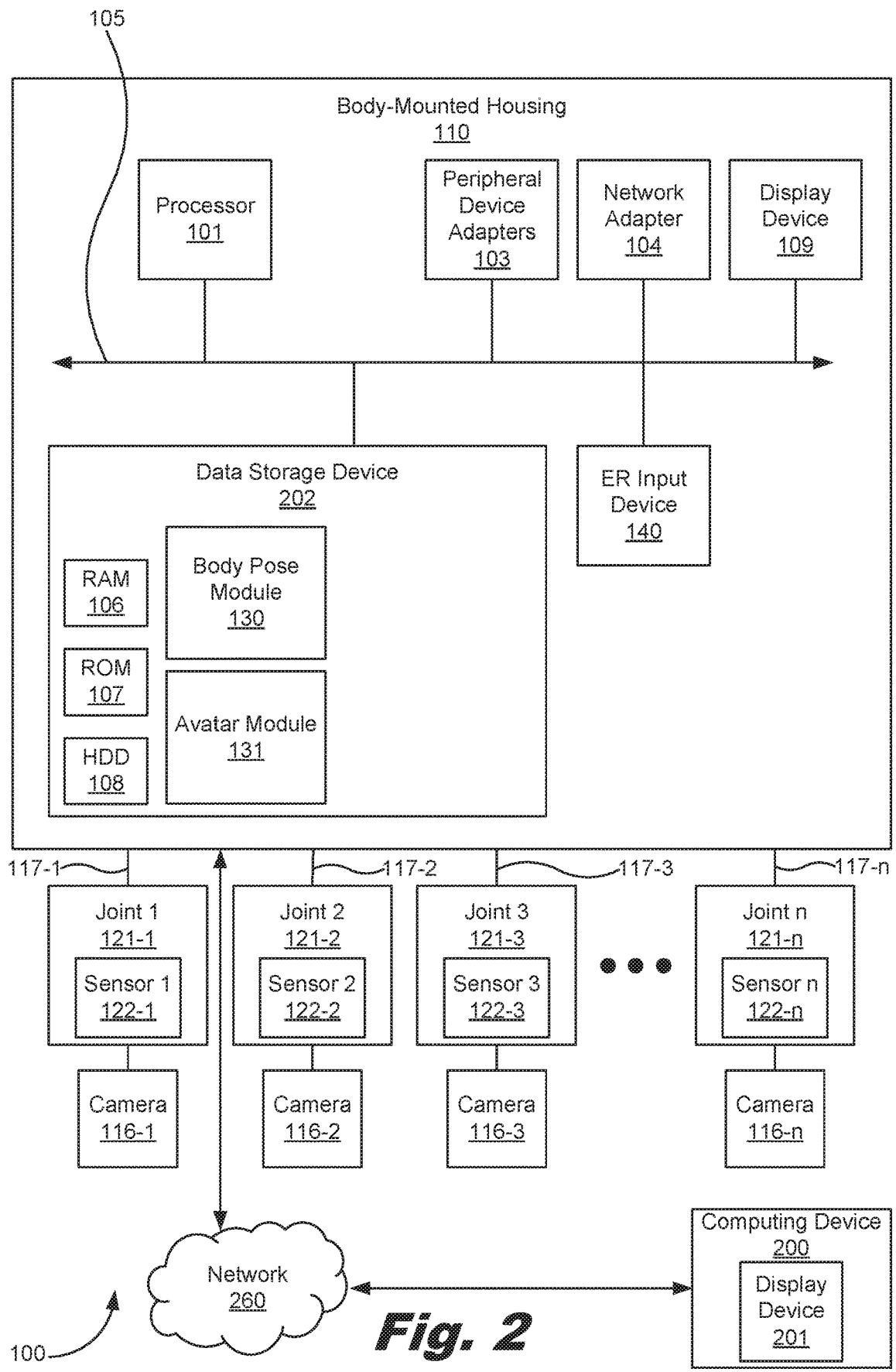
FIG. 2 is a block diagram of an enhanced reality system, according to another example of the principles described herein.

FIG. 2 is a block diagram of an ER system (100), according to another example of the principles described herein. The ER system (100) may be implemented in a number of electronic devices. Examples of electronic devices include ER systems, servers, desktop computers, laptop computers, personal digital assistants (PDAs), mobile devices, smartphones, gaming systems, and tablets, among other electronic devices, or combinations thereof.

The ER system (100) may be utilized in any data processing scenario including, stand-alone hardware, mobile applications, through a computing network, or combinations thereof. Further, the ER system (100) may be used in a computing network, a public cloud network, a private cloud network, a hybrid cloud network, other forms of networks, or combinations thereof. In one example, the methods provided by the ER system (100) may be provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example; the methods provided by the ER system (100) are executed by a local administrator.

To achieve its desired functionality, the body-mounted housing of the ER system (100) may include various hardware components. Among these hardware components may be a number of processors (101), a number of data storage devices (102), a number of peripheral device adapters (103), and a number of network adapters (104). These hardware components may be interconnected through the use of a number of busses and/or network connections. In one example, the processor (101), data storage device (102), peripheral device adapters (103), and a network adapter (104) may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of capturing at least one image in three-dimensional (3D) space of at least one extremity of a body of a user on which the body-mounted housing is mounted, deriving data of a users body pose based on the at least one image captured by the camera, rendering a sharable avatar of the user's body based on the derived body pose data, and sending the rendered avatar of the user's body to at least one display device communicatively coupled to the avatar module, or combinations thereof, according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106). The data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the body-mounted housing (110) of the ER system (100) enable the processor (101) to interface with various other hardware elements, external and internal to the body-mounted housing (110). For example, the peripheral device adapters (103) may provide an interface to input/output devices, such as, for example, display device (109), a mouse, or a keyboard, sensors (122-1, 122-2, 122-3, 122-n, collectively referred to herein as 122) within a number of joints (121-1, 121-2, 123-3, 123-n, collectively referred to herein as 123), the cameras (116), a network (260), and a computing device (200) and associated display device (201) communicatively coupled to the body-mounted housing (110) via the network (260). The peripheral device adapters (103) may also provide access to other external devices such as an external storage device, a number of network devices such as, for example, servers, switches, and routers, client devices, other types of computing devices, and combinations thereof.

The display device (109) may be provided to allow a user of the body-mounted housing (110) of the ER system (100) to interact with and implement the functionality of the ER system (100). The display device (09) may be internal or external to the body-mounted housing (110), and may take the form of a HMD worn on the head of the user or a display device that others not participating in the ER environment may view the activities within the ER environment. The peripheral device adapters (103) may also create an interface between the processor (101) and the display device (109), a printer, or other media output devices. The network adapter (104) may provide an interface to other computing devices within, for example, a network, thereby enabling the transmission of data between the body-mounted housing (110) and other devices located within the network including the computing device (200) and its associated display device (201).

The body-mounted housing (110) of the ER system (100) may, when executed by the processor (101), display a number of visuals associated with an ER system (100) on the display device (109). The visuals may include, for example, the actions taken by the user within the ER system (100), perspectives of the user within the ER system (100), perspectives of a number of other users within the ER system (100), a number of avatars of a plurality of users within the ER system (100), other visuals within an ER system (100), and combinations thereof. Examples of display devices (109) include a head-mounted display, a computer screen, a laptop screen, a mobile device screen, a personal digital assistant (FDA) screen, and a tablet screen, among other display devices (116).

The body-mounted housing (110) may also include a number of ER input devices (140). These ER input devices (140) may be any type of device used during an ER scenario to interact with the ER environment. For example, the ER input devices (140) may include handheld controllers (FIG. 3, 304) such as the TOUCH™ controllers manufactured and distributed by Samsung Electronics Corporation, motion controllers, gamepads, HMDs, other ER input devices (140), and combinations thereof.

The body-mounted housing (110) may further include a number of modules used in the implementation of the functions described herein. The various modules within the body-mounted housing (110) include executable program code that may be executed separately. In this example, the various modules may be stored as separate computer program products. In another example, the various modules within the body-mounted housing (110) may be combined within a number of computer program products; each computer program product including a number of the modules.

The body-mounted housing (110) may include a body pose module (130) to, when executed by the processor (101), derive data of a user's body pose based on the at least one image captured by the at least one camera (116). The data of the user's body pose may be used to create a skeletal rig (FIG. 4, 400) of the user's body (FIGS. 3 and 4, 300) including joint identifiers (FIG. 4, 401) and a framework (FIG. 4, 402) connecting the joint identifiers (FIG. 4, 401).

This may be performed by detecting approximate boundaries of the limbs or extremities (301-1, 301-2, 302-1, 302-2) of the user extending away from the respective camera (116) locations. The detection of the approximate boundaries of the limbs or extremities (301-1, 301-2, 302-1, 302-2) may be performed by region filling techniques that extend similarly colored regions away from the hip or shoulder locations of the user. The shape and location of these regions may be used to estimate the skeletal rig (FIG. 4, 400) of the user's pose at any given time and in real time as the user changes his or her pose.

The body pose module (130) may also use additional cues in determining the disposition of the user's limbs or extremities (301-1, 301-2, 302-1, 302-2) including, for example, human musculoskeletal limitations on joint movement, possible current poses given a previous detected pose, and depth detecting techniques. In one example, the depth detecting techniques may include instructing each camera (116) to capture views of another limb or extremity (301-1, 301-2, 302-1, 302-2) as indicated by the dashed lines (405), thus estimating depth by comparing images of a particular limb from two or more camera positions. The depth detecting techniques may be used to refine the estimate of the pose of the user. In another example, the cameras (116) may be depth sensing cameras that use projected near infrared light and an image sensor to detect depth such as the imaging systems found in the KINECT™ motion sensing input device developed and distributed by Microsoft Corporation.

The body pose module (130) may also derive limb joint parameters from a sequence of images, and may use machine learning to accomplish this derivation. Machine learning gives computers the ability to learn without being explicitly programmed to perform certain functions. Such a machine learning limb joint derivation process may allow a computing device to continue to learn to better recognize limb positions while in use. Further, the body pose module (130) may also detect the approximate three-dimensional boundaries of the limbs or extremities (301-1, 301-2, 302-1, 302-2) based on the individual's body shape, clothing, and other objects connected to the user.

Figure 3:
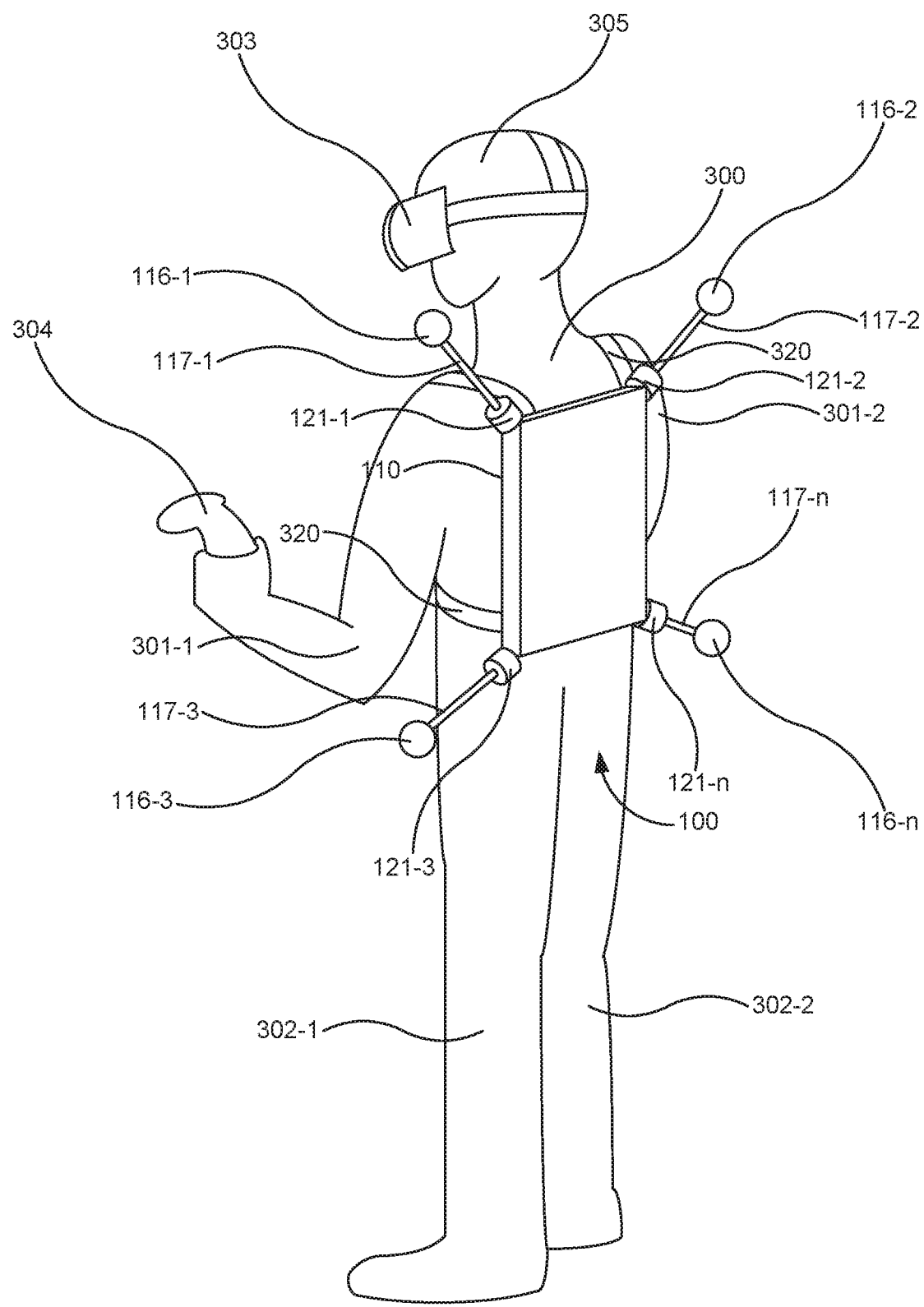
FIG. 3 is a view of a body-mounted housing worn by a user, according to an example of the principles described herein.
Figure 4:
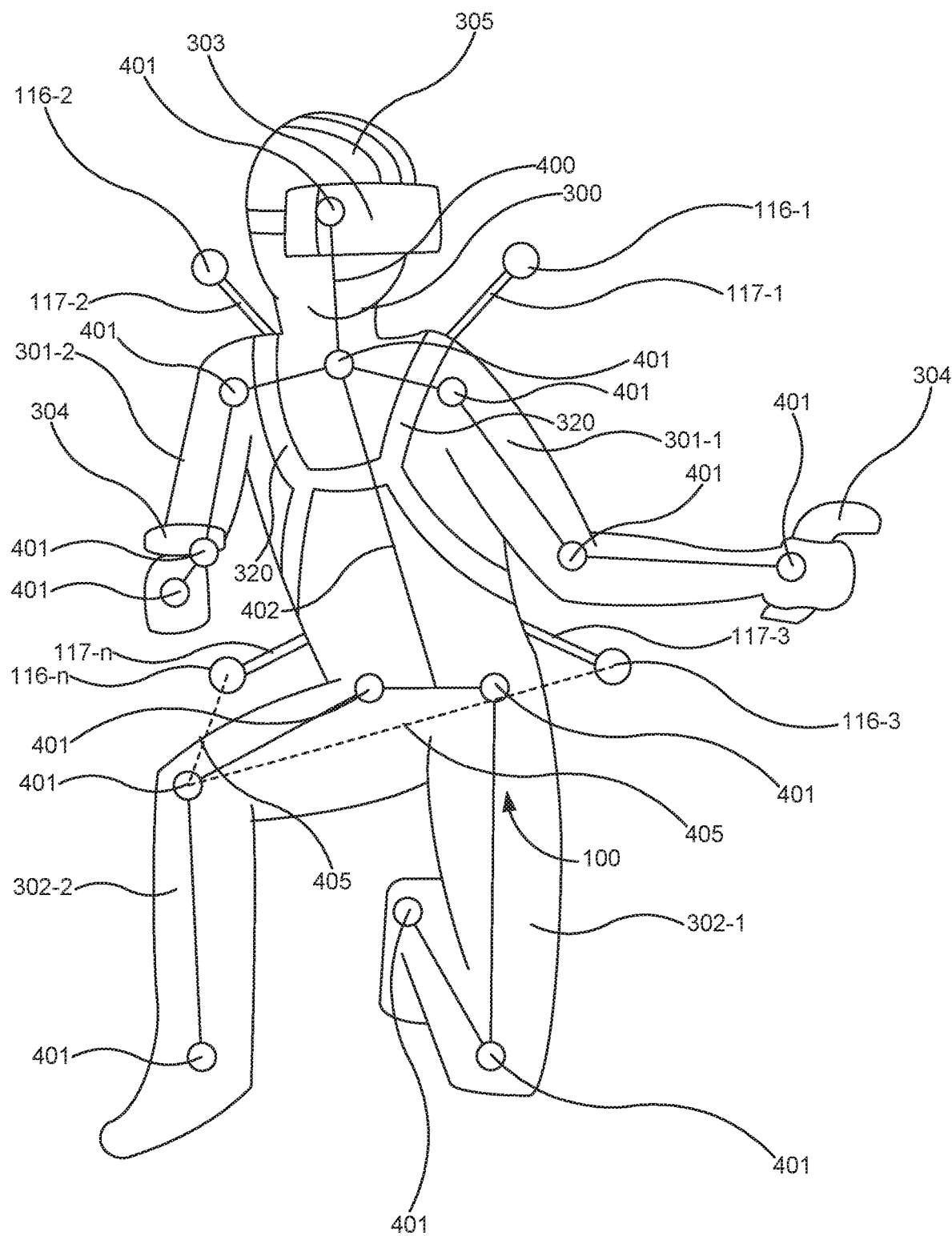
FIG. 4 is a view of the body-mounted housing worn by a user, according to another example of the principles described herein.

Further, in one example, the cameras 116-1 and 116-2 may also capture the relative position and orientation of the user's head (FIGS. 3 and 4, 305). The relative position and orientation of the user's head (FIGS. 3 and 4, 305) may be aided by the physical limits on the user's neck and head movement, and by markers such as fiducials and light emitting diodes (LEDs) on the HMD (FIGS. 3 and 4, 303). With the ER system (100) tracking the position and orientation of the HMD in space, the relative position of the HMD determined by the cameras 116-1 and 116-2 may also provide the location and orientation in space of the entire body-mounted housing (110) and cameras (116), and thus the location and orientation in space of the estimated skeletal rig (FIG. 4, 400). This information may also be used to refine the pose estimates given the constraint that limbs or extremities (301-1, 301-2, 302-1, 302-2) cannot penetrate the real-world ground plane.

The body-mounted housing (110) may include an avatar module (131) to, when executed by the processor (101), render an avatar of the user's body based on the at least one image captured by at least one of the cameras (116). With data representing the skeletal rig (FIG. 4, 400), the ER system (100) may animate a representative avatar of the user who is wearing the body-mounted housing (110) using a character animation process. In one example, the cameras (116) may be used to determine the user's shape including the user's height, weight, proportions, and other dimensions of the user. Further, other physical characteristics such as colors of the user's skin, hair, and clothes may be detected by the cameras (116). This data may be used in deriving and rendering an avatar of the user.

The avatar may be displayed to the user and other users sharing the ER system (100). This enables the users of the ER system (100) to experience more meaningful interaction within the ER system (100) and its environment. The avatar may be displayed on any display device including, for example, display device (109) which may be the HMD (FIGS. 3 and 4, 303) of the user wearing the body-mounted housing (110) or a display device communicatively coupled to the body-mounted housing (110) that may be used for others not immersed in the enhanced reality environment to view the actions taken by the user wearing the body-mounted housing (110).

In another example, the display device (109) may be the display device (201) of the computing device (200) communicatively coupled to the body-mounted housing (110) via the network (260). In this example, the display device (201) may be an HMD (FIGS. 3 and 4, 303) of another user participating within the ER system (100). In this example, data defining the skeletal rig (FIG. 4, 400) of the user may be sent to the computing device (200), rendered at the computing device (200) using an avatar module (131) stored and executed on the computing device (200), and displayed as an avatar on the HMD display device (201). In another example, the display device (201) of the computing device (200) may be, for example, a display screen on which users not participating in the ER environment may view the user's avatar In still another example, the rendered avatar rendered by the avatar module (131) may also be used to give the user a view of their own body such that the user may see his or her limbs or extremities (301-1, 301-2, 302-1, 302-2). In this example, the skeletal rig (FIG. 4, 400) of the user may be utilized by the avatar module (131) to render and display the avatar on the HMD (109) of the user wearing the body-mounted housing (110). The display of the avatar on the HMD (109) may allow the user to look around at his or her limbs or extremities (301-1, 301-2, 302-1, 302-2) and view an avatar representation thereof. This may assist the user in orienting his or herself in the enhanced reality environment.

The derivation of body pose data by the body pose module (130) may include approximating the three-dimensional boundaries of the user based on the captured images from the cameras (116), estimating a limb pose of the user based on the captured images, estimating a skeletal frame of the user based on the captured image using the body pose module (130), and determining a position and an orientation of the HMD (109) via at least one camera (116). Deriving body pose data may also include consideration for anatomical properties and movements of the user's body. The anatomy limitations such as a proper movement of limbs and knowledge that the limbs or extremities (301-1, 301-2, 302-1, 302-2) do not hyperextend past a certain degree or angle may also be used to derive body pose data. Still further, deriving body pose data may include consideration for a number of spatial constraints within a non-enhanced reality environment such as a knowledge that the limbs or extremities (301-1, 301-2, 302-1, 302-2) cannot move through boundaries such as walls, floors, and ceilings, which may also be used to orient derived body pose data in space.

FIGS. 3 and 4 will now be described in connection with FIG. 2. FIG. 3 is a view of the body-mounted housing (110) worn by a user, according to an example of the principles described herein. FIG. 4 is a view of the body-mounted housing (110) worn by a user, according to another example of the principles described herein. A user may have a head (305), two arms (301-1, 301-2), and two legs (302-1, 302-2) that may all be classified as limbs or extremities (301-1, 301-2, 302-1, 302-2). The body-mounted housing (110) may, in one example, be mounted to the user as a backpack, and the body-mounted housing (110) may, in this example, include a backpack form factor where the body-mounted housing (110) is coupled to the users body at the back of the user via a number of coupling devices such as straps (320).

As described herein, the cameras (116) may be positioned to capture at least one image of a body (FIG. 3, 300) of a user on which the body-mounted housing (110) is mounted. In one example, the cameras (116) are mounted on a number of mechanical arms (FIG. 2, 117-1, 117-2, 117-3, 117-*n*, collectively referred to herein as 117) that extend away from the body-mounted housing (110). Each of the mechanical arms (117) may include a dislocatable joint (121). The dislocatable joints (117) may cause the mechanical arms (117) and the cameras (116) to remain attached to the body-mounted housing (110) if a user bumps or knocks one of the mechanical arms (117) or cameras (116). The dislocatable joints (117) may include a number of springs that are biased to cause the dislocatable joints (117) to return to an original position before the mechanical arms (117) or cameras (116) were bumped or knocked.

Further, a sensor (122) may be included in each dislocatable joint (117). The sensors (122) may detect when the joints are positioned in an original orientation where the arms are not out of place and the dislocatable joints (117) are not dislocated. The sensors (122) may also detect when the joints are not positioned in an original orientation where the arms are out of place and the dislocatable joints (117) are dislocated. In one example, the sensors (122) may cause the cameras (116) to not take images, or may cause the processor (101) to disregard any images taken by the cameras (116) when the dislocatable joints (117) are dislocated. In this manner, images that are not aligned according to the original, non-dislocated position of the mechanical arms (117) are not used to derive the skeletal rig (FIG. 4, 400) of the user's body (FIGS. 3 and 4, 300) or render the sharable avatar of the user's body based on the at least one image captured by at least one of the cameras (116).

The skeletal rig (400) of FIG. 4. may include a number of joint identifiers (FIG. 4, 401) that identify a number and location of the body joints of a user. The joint identifiers (FIG. 4, 401) may be used to form the skeletal rig (400) by imaging the movement of the user's limbs or extremities (301-1, 301-2, 302-1, 302-2). In one example, the joint identifiers (FIG. 4, 401) may be identified at a number of joints or parts of the user's body including, for example, a head, a neck, at least one shoulder, at least one elbow, at least one wrist, at least one hand, at least one hip, at least one knee, at least one ankle, other bodily joints, or combinations thereof.

As depicted in FIGS. 3 and 4, the user may also utilize a number of handheld controllers (FIG. 3, 304) and a HMD (303). These devices allow the user to interact with the enhance reality environment and the ER system (100).

Figure 5:
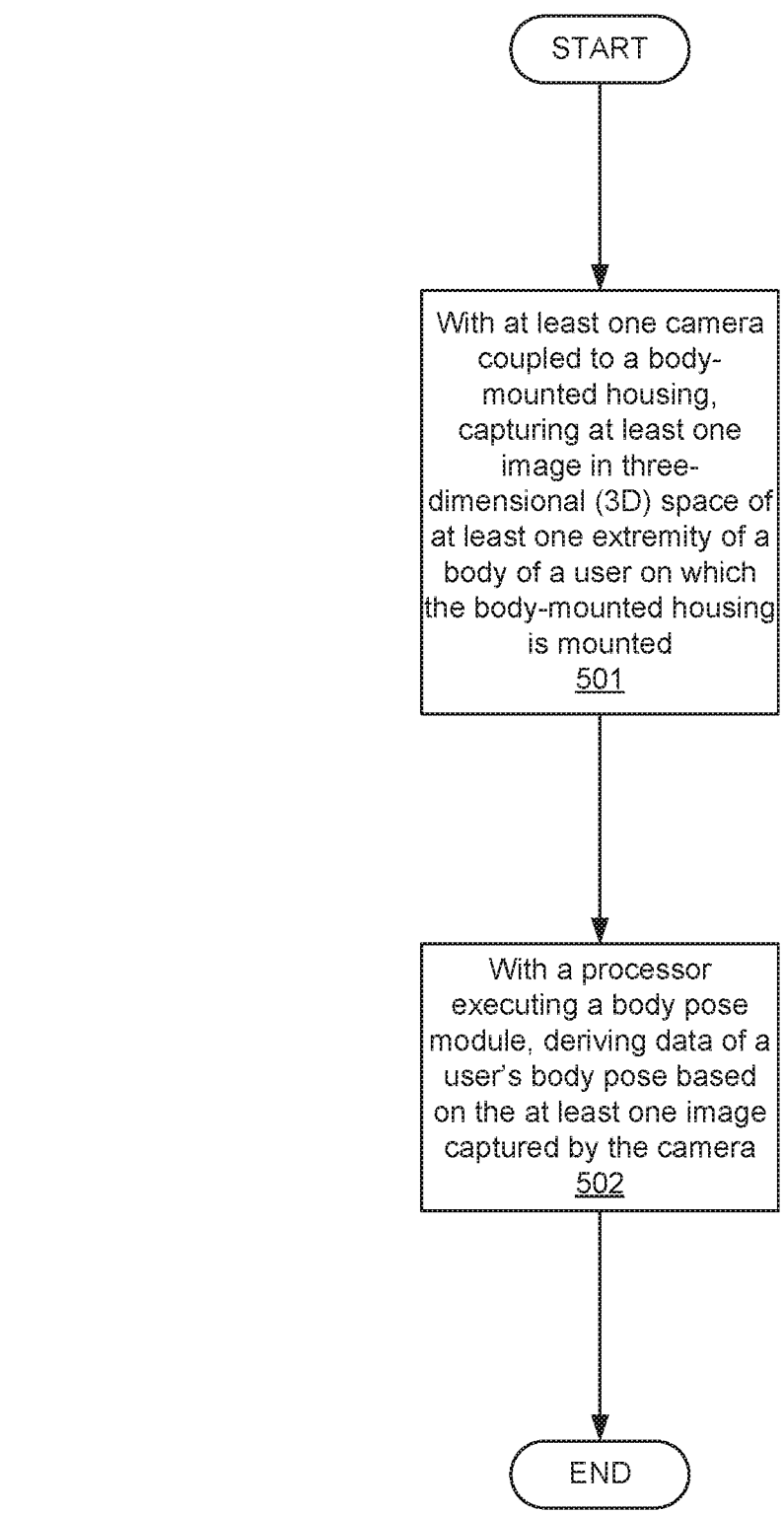
FIG. 5 is a flowchart showing a method of deriving data of a user's body pose in an enhanced reality system, according to an example of the principles described herein.

FIG. 5 is a flowchart showing a method (500) of deriving data of a user's body pose in an enhanced reality system (100), according to an example of the principles described herein. The method may begin by capturing (block 501) at least one image in three-dimensional (3D) space of at least one extremity (301-1, 301-2, 302-1, 302-2) of a body of a user on which the body-mounted housing (103) is mounted. The images may be captured with at least one of the cameras (116) coupled to the body-mounted housing (110). Data of a user's body pose may be derived (block 502) based on at least one of the images captured by the cameras (116). Block 502 may be performed by the processor (101) executing the body pose module (FIG. 2, 130), and may include estimating a limb pose and a skeletal frame of the user based on the images captured by the cameras (116).

The result of blocks 501 and 502 is the creation of data representing the skeletal rig (FIG. 4, 400) of the user's body (FIGS. 3 and 4, 300) including joint identifiers (FIG. 4, 401) and a framework (FIG. 4, 402) connecting the joint identifiers (FIG. 4, 401). Although the examples described herein use the skeletal rig (FIG. 4, 400) to render an avatar of the user, the skeletal (FIG. 4, 400) rig may be used for a myriad of purposes. For example, the skeletal rig (FIG. 4, 400) may be used to generate an avatar for use in social interactions and collaborations across a network. In another example, the skeletal rig (FIG. 4, 400) may be used in physical therapy applications where the user's body movements may be studied to assist in the examination, diagnosis, prognosis, and physical intervention of the user's body. In another example, the skeletal rig (FIG. 4, 400) may be used in robotic control applications where the user's movements within the enhanced reality environment may be translated into movements of a robotic device outside the enhance reality environment. The skeletal rig (FIG. 4, 400) may be used in character animation in movies or other media where the user's movements are translated in motion capture of a character in the media. In still another example, the skeletal rig (FIG. 4, 400) may be used capture the movements of the user for sports training purposes where the user's movements may be analyzed to determine if the user is moving in an effective or appropriate manner with regard to the sport.

Figure 6:
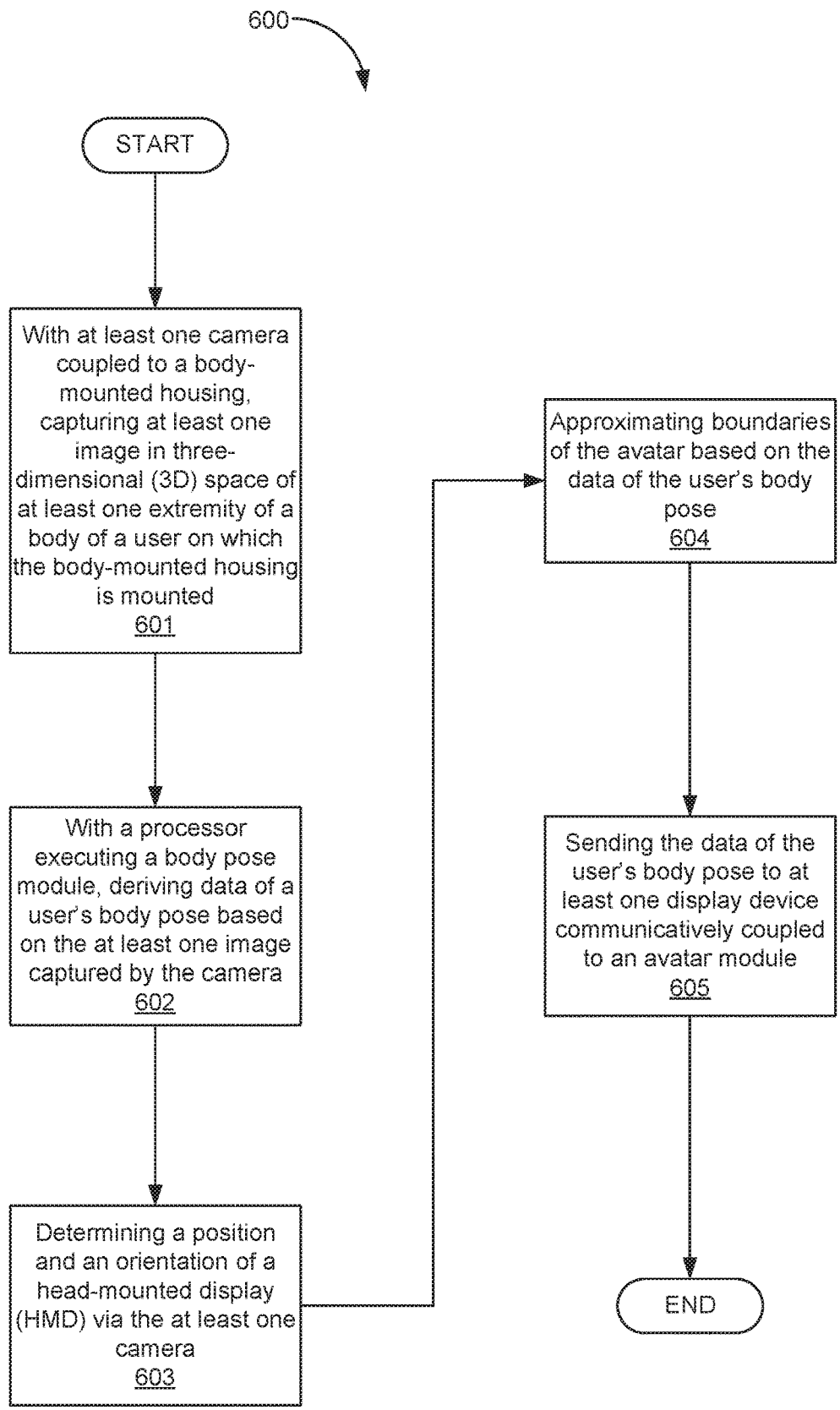
FIG. 6 is a flowchart showing a method of deriving data of a user's body pose in an enhanced reality system, according to another example of the principles described herein.

FIG. 6 is a flowchart showing a method (600) of deriving data of a user's body pose in an enhanced reality system, according to another example of the principles described herein. FIG. 6 includes blocks 601 and 602 that are identical to blocks 501 and 502 of FIG. 5, and their description is provided herein. At block 603, a position and orientation of the HMD (303) relative to the body-mounted housing (110) and cameras (116) may be determined (block 603). In one example, block 603 may use at least one camera (116) to image a number of markers such as fiducials and light emitting diodes (LEDs) on the HMD (FIGS. 3 and 4, 303) to determine (block 603) the relative position and orientation of the HMD (303). This data may be transmitted to the body-mounted housing (110) or the computing device (FIG. 2, 200) for processing. In this manner, an avatar of the user may be rendered by the computing devices (110, 200) locally or remotely to present the avatar for display on their respective display devices (109, 201).

An avatar of the user's body may be rendered by executing the avatar module (FIG. 2, 131), based on the at least one image captured by the cameras (116) and the skeletal rig (FIG. 4, 400). The boundaries of the avatar may be approximated (block 604) based on the at least one image captured by the cameras (116) and the skeletal rig (FIG. 4, 400) as derived from the data of the user's body pose.

Data representing the user's body pose may be sent (block 605) to at least one display device (109, 201) for rendering of an avatar of the user, and display of that avatar to the user and other individuals participating in the ER environment or viewing the ER environment. In this example, the data representing the user's body pose may be processed by the computing device (110, 200) associated with the display device (109, 201). Allowing the data representing the user's body pose to be transmitted to the computing devices (110, 200), rather than transmitting a rendered avatar, allows for processing tasks to be distributed among a number of computing devices (110, 200) rather than being centralized by one computing device. Further, by transmitting the data representing the user's body pose, less data is transmitted making the transmission of this data faster. In another example, a rendered avatar may be sent (block 605) to at least one display device (109, 201) of the computing devices (110, 200). In this example, rendering of the avatar may be performed by the hardware devices (101, 102) and avatar module (131) of the body-mounted housing (110), and sent to the display devices (109, 201). In these examples, the user and others are able to view the avatar as it mimics the user's movements within the ER environment.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (101) of the body-mounted housing (110) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of deriving data of a user's body pose in an enhanced reality system includes, with at least one camera coupled to a body-mounted housing, capturing at least one image in three-dimensional (3D) space of at least one extremity of a body of a user on which the body-mounted housing is mounted, and with a processor executing a body pose module, deriving data of a user's body pose based on the at least one image captured by the camera. Further, the specification and figures describe an enhanced reality system including a body-mounted housing, at least one camera mounted to the body-mounted housing, the at least one camera being positioned to capture at least one image of a body of a user on which the body-mounted housing is mounted, and a body pose module to, when executed by a processor, derive data of a user's body pose based on the at least one image captured by the at least one camera.

The preceding description has been presented to illustrate and describe examples of the principles described. This description is not intended to be exhaustive or to limit these principles to any precise form disclosed. Many modifications and variations are possible in light of the above teaching.

What is claimed is:
1. An enhanced reality system, comprising:
a body-mounted housing;
at least one camera mounted to the body-mounted housing, the at least one camera being positioned to capture at least one image of a body of a user on which the body-mounted housing is mounted; and
a body pose module to, when executed by a processor, derive data of a user's body pose based on the at least one image captured by the at least one camera;
wherein the body-mounted housing comprises an arm extending away from the body-mounted housing, the at least one camera being supported on the arm and directed back toward a body of a user wearing the body-mounted housing with a wide field of view so as to image the body of the user to provide images to the body pose module to produce the data of the user's body pose.

2. The enhanced reality system of claim 1, wherein the at least one camera comprises four cameras, wherein each camera is mounted on an arm extending away from the body-mounted housing and captures an extremity of a body of the user in three-dimensional (3D) space.

3. The enhanced reality system of claim 1, further comprising a spring-loaded dislocatable joint between the arm and the body-mounted housing to return that arm to a non-dislocated position if the arm is dislocated.

4. The enhanced reality system of claim 3, comprising:
a sensor to detect when the spring-loaded dislocatable joint is dislocated, wherein the body pose module disregards images captured by the camera in response to a determination that the spring-loaded dislocatable joint is dislocated based on data from the sensor.

5. The enhanced reality system of claim 1, comprising:
an avatar module to, when executed by the processor, render an avatar of a user's body based on the data of a user's body pose; and
at least one display device communicatively coupled to the avatar module to receive and display the rendered avatar in an enhanced reality environment to the user and other users of the enhanced reality environment.

6. A method of deriving data of a user's body pose in an enhanced reality system, comprising:
with at least one camera coupled to a body-mounted housing, capturing at least one image in three-dimensional (3D) space of at least one extremity of a body of a user on which the body-mounted housing is mounted, wherein the body-mounted housing comprises an arm extending away from the body-mounted housing, the at least one camera being supported on the arm and directed back toward a body of a user wearing the body-mounted housing with a wide field of view so as to image the body of the user to provide images;
with a processor executing a body pose module, deriving data of a user's body pose based on a position of the at least one extremity in the at least one image captured by the camera;
with an avatar module, rendering an avatar of the user's body based on the body pose data derived by the body pose module; and
displaying the avatar in an enhanced reality environment of the system to the user.

7. The method of claim 6, further comprising:
approximating boundaries of the avatar based on the captured image.

8. The method of claim 6, wherein deriving data of a user's body pose in an enhanced reality system comprises determining a position and an orientation of the user's head-mounted display (HMD) relative to the user's body via the at least one camera.

9. The method of claim 6, wherein deriving data of a user's body pose in an enhanced reality system uses constraints based on natural movements of the user's body.

10. A computer program product for deriving data of a user's body pose in an enhanced reality system, the computer program product comprising: a non-transitory computer readable storage medium comprising computer usable program code embodied therewith, the computer usable program code to, when executed by a processor: with at least one camera coupled to a body-mounted housing, capturing at least one image in three-dimensional (3D) space of a body of a user on which the body-mounted housing is mounted, wherein the at least one image captures an extremity of the body of the user, and wherein the body-mounted housing comprises an arm extending away from the body-mounted housing, the at least one camera being supported on the arm and directed back toward a body of a user wearing the body-mounted housing with a wide field of view so as to image the body of the user to provide images; with a processor executing a body pose module, deriving data of a user's body pose based on a position of the extremity in the at least one image captured by the camera.

11. The computer program product of claim 10, comprising computer usable program code to, when executed by a processor:
with an avatar module, render an avatar of a user based on the body pose data of a user; and
sending the rendered avatar to at least one display device communicatively coupled to the body-mounted housing to display the avatar in an enhanced reality environment to the user.

12. The computer program product of claim 10, wherein deriving data of a user's body pose in an enhanced reality system comprises determining a relative position and an orientation of the user's head-mounted display (HMD) via the at least one camera.

13. The computer program product of claim 10, wherein deriving data of a user's body pose in an enhanced reality system uses constraints based on anatomical properties and movements of the user's body.

14. The computer program product of claim 10, wherein deriving data of a user's body pose in an enhanced reality system comprises using constraints based on physical real-world boundaries known to the system.

15. The computer program product of claim 12, comprising computer usable program code to, when executed by a processor: identify a fiducial on the head-mounted display.

16. The computer program product of claim 15, wherein the fiducial is a light emitting diode (LED).

17. The method of claim 7, wherein capturing at least one image in three-dimensional (3D) space of at least one extremity of a body of a user on which the body-mounted housing is mounted comprises capturing multiple extremities of the body of the user.

18. The enhanced reality system of claim 1, wherein a view in a head-mounted display used by the user of the enhanced reality system comprises an extremity of the user.

19. The enhanced reality system of claim 1, wherein an avatar of the user depends on at least one of: the skin tone of the user, hair color of the user, and clothing of the user, as captured by the at least one camera.

* * * * *